INVENTOR
HAROLD P. WICKLUND
BY Donald F Voss
ATTORNEY

Oct. 11, 1960 H. P. WICKLUND 2,955,822

TRANSPORT APPARATUS

Filed Dec. 23, 1957 3 Sheets-Sheet 3

2,955,822
Patented Oct. 11, 1960

2,955,822

TRANSPORT APPARATUS

Harold P. Wicklund, Johnson City, N.Y., assignor to International Business Machines Corporation, New York, N.Y., a corporation of New York Filed Dec. 23, 1957, Ser. No. 704,794

16 Claims. (Cl. 271—50)

This invention relates to transport devices and particularly to transport devices for receiving record cards fed at a constant rate and delivering the same to an operating station whereat the cards are successively brought to rest and registered in position to permit an operation to be performed thereupon and subsequently transported therefrom.

Since cards are normally fed at a constant rate, it is necessary to transport the same in a manner to maintain a steady flow or stream of cards to avoid a card jam or pile-up at an operating station. Therefore, because the cards are brought to rest at the work station, the cards must be transported thereto and from at an accelerated rate. The usual operations performed upon record cards such as punching perforations therein or printing indicia thereon at precise index positions or the like require that the cards be accurately aligned at the operating station.

While many transporting devices have been in existence heretofore, the same have successfully operated at speeds much lower than the speeds at which the present invention operates. In some instances mechanical grippers are utilized by the transport apparatus whereby camming means operate the grippers to open and close positions. These types of devices usually require very accurate timing so as not to damage the article being transported. In this invention the article being transported is frictionally held between endless belts and it is not necessary to employ any type of mechanical grippers or camming means to operate the same.

Aside from considering the usual inertia forces of the transport device involved in high speed operation, it is also necessary to consider the inertia forces in connection with the card being transported, since the card must not be damaged as the same is transported and brought to rest. Damage to the cards is kept to a minimum in this invention by insuring low relative velocities between the cards and the transport apparatus and thereby reducing damaging impact forces. Also the velocity of the card is low or at a minimum as it is brought into engagement with a card alignment means for accurately aligning the card at the operating station. Furthermore, and very importantly, the transport apparatus in cooperation with the card alignment means frictionally maintains the card in alignment while the card is at the operating station. Additionally, while the transport apparatus frictionally engages the card to transport it to and from the operating station, means are provided to positively engage and move the card in the event impeding forces other than the mass of the card occur which cannot be overcome by the frictional engaging force. It is not likely that any encumbering forces normally be encountered while the card is in motion; however, with the card at rest at the operating station impeding forces may develop as the card is operated upon.

In general, the transport device comprises a pair of laterally spaced endless belts of the type known as timing belts which are mounted about toothed pulleys to be driven intermittently. The upper surfaces of these belts carry projecting elements or lugs longitudinally spaced from each other in pairs to bracket a card but with a predetermined clearance to permit alignment of the card at the operating station. Another pair of laterally spaced endless belts are disposed above the first mentioned timing belts in a manner to contact the card contained between the projections on the belts. The upper belts are continuously driven at a constant velocity which equals or may be slightly greater than the maximum velocity of the intermittently driven first mentioned or lower belts.

With this arrangement, as a card leaves a suitable card feeding device, the lower timing belts are accelerated to a speed to instantaneously match the speed of the feeding device. The upper belts engage the card to frictionally urge the card forward as the lower timing belts continue to accelerate to reach their maximum speed. Before the lower timing belts reach their maximum speed, the upper belts have urged the card against the forward or leading projections of the spaced pair of projections on the lower timing belts and the card is transported in this manner to follow the acceleration and deceleration of the lower belts in being brought to the operating station.

When the card comes into the operating station, the lower belts are being decelerated and just before they come to a stop, a card aligner mechanism, which is synchronously operated with the drive for the intermittently driven lower timing belts, is operated to enter into the card path. The lower belts overtravel a small amount after the card engages the card aligner mechanism thereby insuring that the leading edge of the card will be brought into engagement with the card aligner mechanism. With the card at the operating station, the upper belts which are constantly driven, frictionally maintain the leading edge of the card in contact with the card aligner mechanism while an operation is being performed upon the card. Subsequent to the operation being performed upon the card but before the lower timing belts are again driven, the card aligner mechanism is operated to be positioned out of the card path. The lower belts are then accelerated to move the card to a remote position and bring another card into the operating station; this action takes place in a time relationship with respect to the rate that the cards are being fed by the feeding mechanism.

It is a principal object of this invention to provide an improved high speed transport device which receives articles fed at a constant rate and bring the same to an operating station whereat the articles are successively aligned and arrested in position to permit an operation to be performed thereupon and subsequently moved therefrom to a remote position to permit another article to be brought into the operating station.

A further object of this invention is to provide a high speed transport device for receiving articles fed thereto at a constant rate which brings the same to rest against an alignment means at on operating station and to hold the articles in alignment at this operating station while an operation is being performed thereupon.

Another object of this invention is to provide a high speed transport device for receiving articles fed thereto at a constant rate and transport the same to rest at an operating station which maintains a low relative velocity with respect to the articles being transported and thereby substantially eliminate damage to the articles.

Still another object of this invention is to provide a high speed transport device for receiving articles fed thereto at a constant rate to bring the same to rest at an operating station which is of simple construction.

Other objects of the invention will be pointed out in the following description and claims and illustrated in the accompanying drawings, which disclose, by way of examples, the principle of the invention and the best mode, which has been contemplated, of applying that principle.

Figure 5:
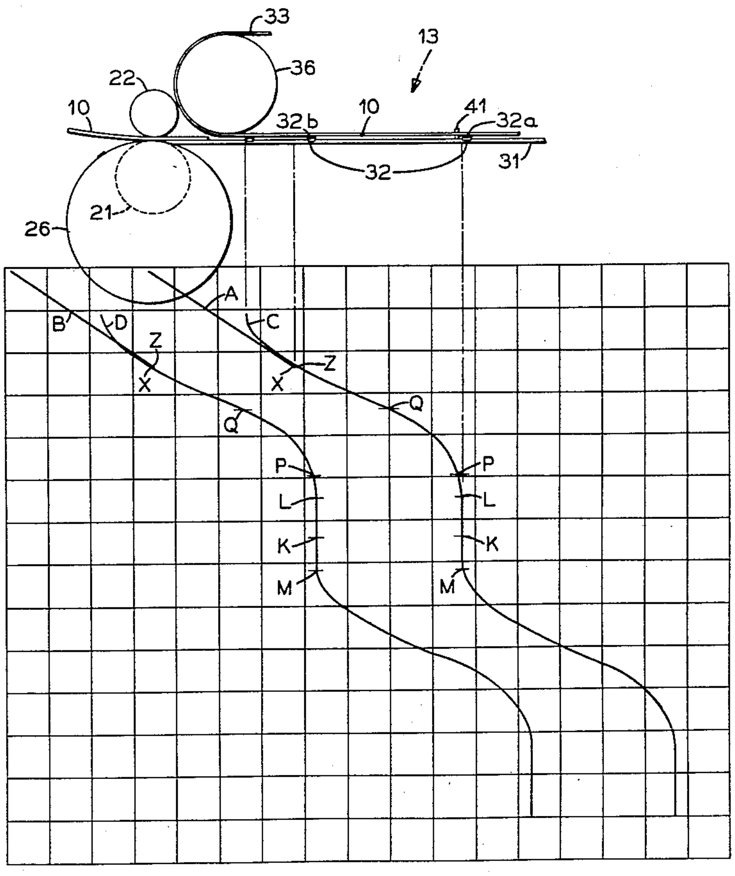

Fig. 5 is a timing diagram showing movement of the card and the forward and rearward projections or displacement of the intermittently driven belts as cards are received from the feeding means and transported to the operating stations, together with a diagrammatic partial side elevation view of the transport apparatus with the leading edge of the card against the alignment means at the first punch station and with the forward projecting elements positioned slightly beyond the leading edge and the rearward projecting elements just out of contact with the trailing edge of the card.

Figure 1:
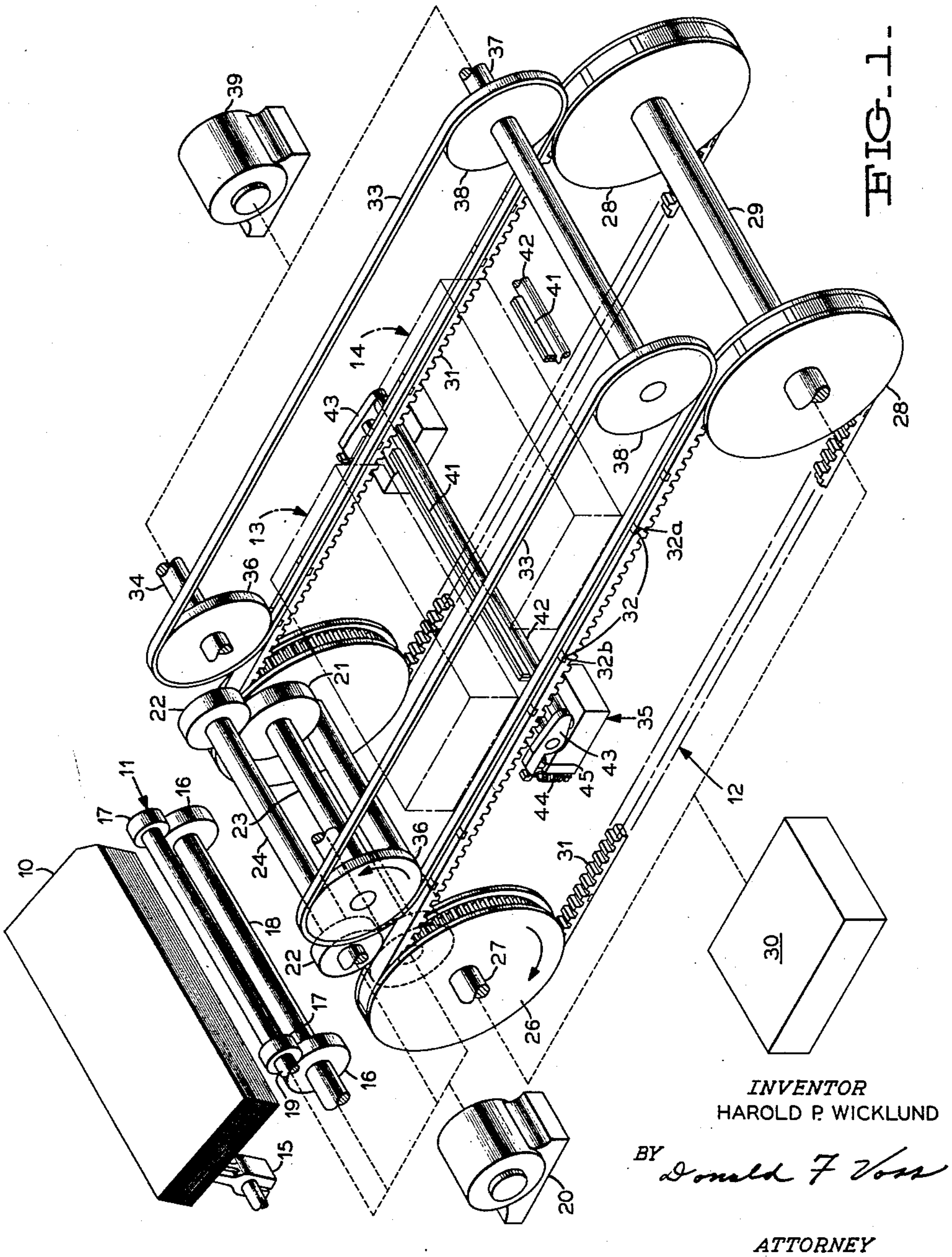
Fig. 1 is a perspective view of the transport device with the drive therefor and the card feeding mechanism schematically shown.

Referring now to the drawings and particularly to Fig. 1, the invention is shown by way of example with cards 10 in a stack which are fed by a feeding means 11, partially shown, to a transport or conveying means 12 for transporting the cards in succession to first and second punch stations 13 and 14, respectively, and from the second punch station 14 to a stacking position, not shown.

The feeding means 11 is only partially shown since it does not constitute a part of the invention; however, cards 10 are presented one at a time, by any suitable means, such as a feed knife 15 or the like to a pair of cooperating feed rolls 16 and 17 carried by shafts 18 and 19, respectively. The shafts 18 and 19 are preferably driven at a constant velocity by a motor 20, the connections therebetween are shown by a dashed line. A second set of cooperating feed rolls 21 and 22 carried on shafts 23 and 24, respectively, in the same manner as the feed rolls 16 and 17 and also driven at a constant velocity by the motor 20 are positioned forward of the feed rolls 16 and 17 to engage the forward or leading edge of the card 10 before the trailing edge thereof leaves the feed rolls 16 and 17.

A pair of pulleys 26 of the type adapted to drive timing belts are laterally spaced from each other along a suitably journalled shaft 27 to flank the feed rolls 21, while a set of pulleys 28 similar to the pulleys 26 are carried by a suitably journalled shaft 29 spaced from and parallel with the shaft 27 to lie well beyond the second punch station 14. Parallel spaced endless timing belts 31 are disposed to drivably connect the associated pulleys 28 with the pulleys 26. The shaft is intermittently driven by any suitable means such as a hydraulic drive mechanism 30 and control therefor which is fully described in the application of Stanley C. Titcomb, Serial No. 698,840, filed November 25, 1957.

Extending from the upper surfaces of the timing belts 31 are projecting elements or lugs 32. These projecting elements 32 are longitudinally spaced from each other in pairs along the belt surfaces to bracket a card but with a clearance, and in this example, a clearance of ⅛ inch to permit alignment of the card at the punch stations 13 and 14. The projecting element adjacent the leading edge of the card or the forward projecting element will hereinafter be designated **32*a*, and the other projecting element of the pair or rearward projecting element designated 32*b*. Since the two punch stations are spaced from each other the adjacent projecting elements 32** of successive pairs are in this example spaced a like distance.

The height of the projecting elements 32 is approximately the thickness of a card if the projecting elements 32 extend across the width of the belt, or if they are disposed very near the outer edge of the belt, the height thereof may be greater. In this example the projecting elements 32 extend across the width of the belts and their height is approximately the thickness of a card. The distance that the pulleys 26 and 28 of each pair are spaced apart from each other is determined by the length of the cards. In any event the cards 10 are provided with an adequate margin whereby the forward and rearward projecting elements **32*a* and 32*b* may engage the leading or trailing edges of the card without later causing interference at the punch stations 13 and 14. The forward and rearward projections 32*a* and 32*b***, respectively, as will be seen shortly, have very important functions.

The forward projections **32*a* provide a fixed surface relative to the intermittently driven belts against which the leading edge of a card may be frictionally held by means to be described hereinafter to effect a grip upon the card for conveyance of the same. Also, in this instance, the forward projections 32*a* serve to register the leading edge of the card and hence it becomes an easy matter to synchronize the operation of a card aligner mechanism 35 for aligning the cards at the punch stations 13 and 14. As the card is brought to the first punch station 13, the leading edge thereof is abutting the forward projections 32*a* and the trailing edge of the card is approximately ⅛ of an inch from the rearward projection 32*b*, and just before the timing belts 31 are decelerated to a stop, the card aligner mechanism 35 is operated to come into the card path to engage the leading edge of the oncoming card. The forward projections 32*a* as well as the rearward projections 32*b* continue to travel or overtravel approximately $\frac{1}{16}$ of an inch which is one half of the clearance provided between the card 10 and the pairs of projections 32 on the belts 31. Hence the forward and rearward projections 32*a* and 32*b* will be approximately $\frac{1}{16}$ of an inch from the leading and trailing edges of the card, respectively. The drive 30 for intermittently driving the timing belts 31 is provided with a detent mechanism not shown which enables the belts 31 to be stopped quite precisely. Hence the card is assured of proper registration at the punch station since the timing belts 31 overtravel, however, not a sufficient amount to cause buckling of the card by the rearward projections 32*b*. After an operation is performed upon the card at the punch station 13 it must be conveyed therefrom at an accelerated speed. However, the card may have a tendency to reside at the punch station; hence if the means for frictionally urging the leading edge of the card against the forward projections 32 cannot overcome the forces causing the card to reside at the punch station, the rearward projections 32*b* will engage the trailing edge of the card positively to force the card from the punch station, and thereafter, since the impeding forces are no longer present, the leading edge of the card will then be brought against the forward projections 32*a*** by the means for frictionally urging the card forward.

The means for frictionally urging the cards forward comprise a pair of parallel spaced endless belts 33 which are disposed to cooperate with the belts 31 to transport the cards 10. A suitably journalled shaft 34 is positioned above and ahead of the shaft 27 and carries along its longitudinal axis a pair of parallel spaced pulleys 36; while another suitably journalled shaft 37 disposed above and rearward of the shaft 29 carries along its longitudinal axis a like pair of parallel spaced pulleys 38. The belts 33 are disposed about the associated pulleys 36 and 38 in a manner to provide a driving connection therebetween.

Either the shaft 34 or the shaft 37 may be driven and at a constant speed by a suitable motor 39. The driving connections therebetween are represented by a dashed line and thereby drive the parallel spaced belts 33 through the pulleys 36 or 38, respectively. The belts 33 are spaced from each other by suitably spacing the pulleys 36 and 38 of each pair along the shafts 34 and 37, respectively, to frictionally engage the cards along the side margins thereof so as not to cause interference at the punch stations. Since the belts 33 are driven constantly at a velocity equal to a slightly greater than the maximum velocity of timing belts 31 they continually urge the cards upon engagement thereof in the forward direction or direction of travel as the case may be.

Figure 3:
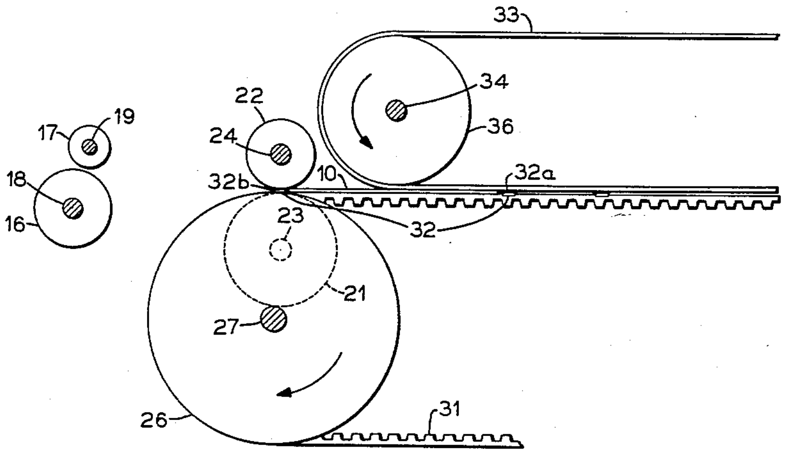
Fig. 3 is a diagrammatic partial side elevation view of the transport device showing the position of the card between the belt just after the feed rolls have released their grip upon the card.

Referring now to Fig. 3 as the card leaves the cooperating feed rolls 21 and 22 there is approximately 1/16 of an inch clearance between the leading and trailing edges and the forward and rearward projections **32*a* and 32*b*, respectively. The timing belts 31 are being accelerated and the belts 33 are running at a constant speed and hence the belts 33 initially advance the card between the pair of projections 32 so that the leading edge thereof engages the forward projections 32*a* and remains in engagement therewith until the leading edge of the card engages a transverse bar or gate 41 of the aligner mechanism 35. As the leading edge engages the transverse bar 41, the forward projections 32*a* which are being decelerated overtravel and come to rest quite precisely with the rearward projections 32*b* within close proximity of the trailing edge of the card but without causing the card to buckle. The belts 33 which are continuously driven at a constant speed frictionally maintain the leading edge of the card against the transverse bar 41 throughout the punching operation. Hence it is seen that the belts 33 not only provide the cooperative action to maintain the leading edge thereof against the forward projections 32*a* so as to provide in effect a grip upon the card and whereby the leading edge is held in a precise position as the card is in motion, but the belts 33** also function to maintain the card in register or alignment at the punch stations.

The transverse bar 41 of the aligner mechanism is mounted to extend upwardly from the periphery of a rod 42 which is secured between and to one of the ends of a pair of laterally spaced pivotally mounted levers 43. The other ends of the levers are biased by springs 44 so that the bar 41 will lie in the card path. However, the bar 41 normally is caused to lie out of the card path by means of pistons 45 which are hydraulically operated to act upon the levers or rocker arms 43 in opposition to and overbalance the biasing force of the springs 44. When the fluid pressure is relieved upon the pistons 45, the springs 44 cause the levers 43 to pivot counterclockwise and thereby bring the transverse bar 41 into the card path. This operation is synchronized with the hydraulic drive 30 for intermittently driving the timing belts 31. The levers 43 could also be operated by cams rotating in synchronism with the hydraulic drive so as to move the transverse bar 41 into and out of the card path at the proper time.

Referring now to Fig. 1 and the timing diagram in Fig. 5, the cards 10 are properly presented one at a time by the feed knife 15 to the cooperating feed rolls 16 and 17 and then fed thereby to the cooperating feed rolls 21 and 22. Both pairs of feed rolls just mentioned are driven at a constant velocity by the motor 20 and therefore the cards are moving at a constant velocity. Card movement during this period is represented by the straight lines A and B, in Fig. 5, for the leading and trailing edges of the card, respectively.

Figure 2:
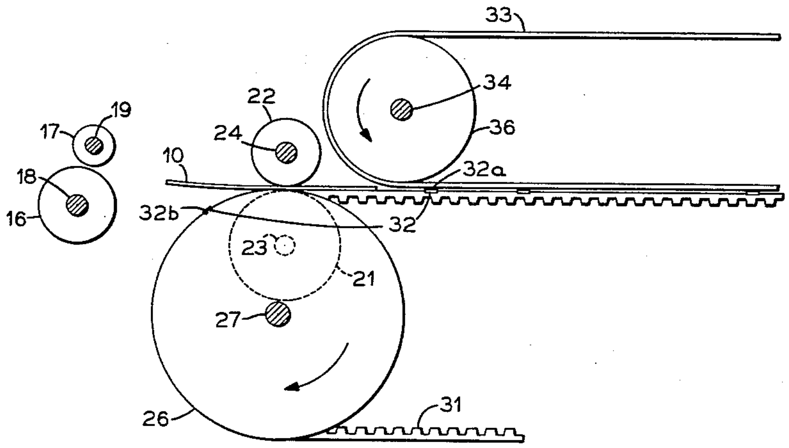
Fig. 2 is a diagrammatic partial side elevation view of the transport device showing the position of a card just before it enters between the upper and lower belts.
Figure 4:
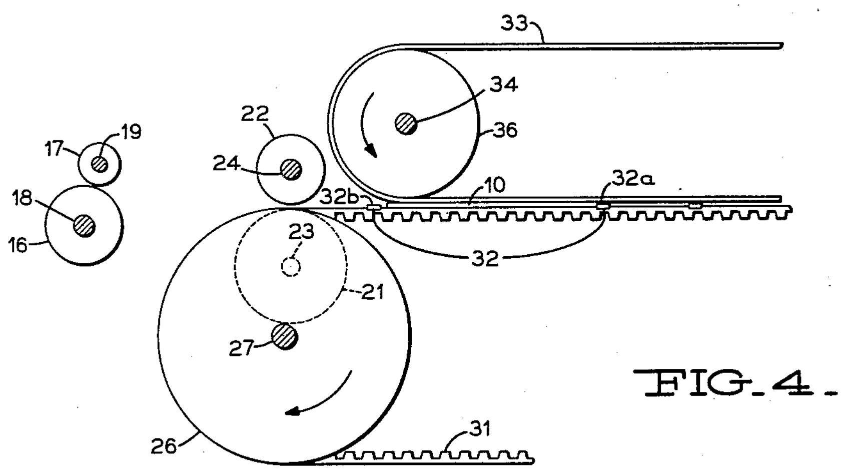
Fig. 4 is a diagrammatic partial side elevation view of the transport device showing the position of the card with the leading edge thereof in engagement with the forward projecting elements.

As the leading edge of the card approaches the bite formed between the belts 31 and 33, as shown in Fig. 2, the timing belts 31 are being accelerated from rest or stopped position by the hydraulic drive 30 and the forward and rearward projecting elements **32*a* and 32*b* describe the curves C and D in Fig. 5. At point X on the curves C and D the timing belts 31 are accelerating but are instantaneously being driven at the same velocity as the cooperating feed rolls 21 and 22. At this same point X on the curves A and B the trailing edge of the card leaves the cooperating feed rolls 21 and 22 and the timing belts 31 continue to accelerate. At this time the forward projecting elements 32*a* are slightly ahead of the leading edge of the card and the trailing edge of the card is ahead of the rearward projecting elements 32*b* as shown in Fig. 3; hence, no damage will be incurred by the card as the same leaves the cooperating feed rolls 21 and 22. With the card 10 no longer under the control of the cooperating feed rolls 21 and 22 the belts 33 which are continuously driven at a constant velocity equal to or slightly greater than the maximum velocity of the timing belts 31 move the card 10 relative to the belts 31 so that the leading edge of the card abuts the forward projecting elements 32*a* as shown in Fig. 4. This action occurs at point Z on the curves C and D. The timing belts 31 continue to accelerate and reach their maximum velocity at point Q on the curves C and D and since the belts 33 maintain the leading edge of the card in contact with forward projecting elements 32*a*, the card follows the acceleration of the timing belts 31. The card 10 continues to follow the movement of the belts 31 by virtue of the cooperative effort of the belts 33 as the timing belts 31 decelerate in approaching the first punch station 13**.

While the timing belts 31 may be brought to rest quite precisely with respect to a desired stopping position of the projecting elements 32 it is desirable to very accurately align the card for a punching operation and therefore the aligner mechanism 35 is utilized. As the card approaches the punch station the fluid under pressure for acting on the pistons 45 is relieved and thereby allowing the springs 44 to cause the bar 41 to move into the card path.

The card is moving at a very low velocity when it engages the bar 41 at point P on the curves C and D and the timing belts 31 overtravel approximately 1/16 inch so that the rearward projecting elements **32*b* are approximately 1/16 of an inch from the trailing edge of the card and in any event without causing the card to buckle. It is also by this arrangement that the card engages the bar 41** at a velocity less than 80 inches/second, which represents a damaging impact velocity for tabulating cards, whereas the average card velocity may be several times this value.

The belts 33 which continually urge the card forward maintain the leading edge of the card against the bar 41 during the punching operation which occurs while the timing belts 31 are not being driven or during the dwell period of the hydraulic drive 30 shown on the curves C and D between the points L and M.

After the punch operation but before the belts 31 are accelerated, the bar 41 is immediately actuated out of the card path by applying fluid under pressure against the pistons 45 to cause the levers 43 to pivot clockwise as the biasing force of the springs 44 is overcome. This action takes place at point K on the curves C and D, respectively. The timing belts 31 shortly thereafter are accelerated in the manner as previously described and if the card tends to reside at the punch station 13 whereby the frictional urging of the belts 33 is not adequate to move the card, the rearward projecting elements **32*b* will positively engage the trailing edge of the card to move the same from the punch station. The belts 33 will then be able to move the card relative to the timing belts 31 so as to bring the leading edge of the card against the forward projecting elements 32*a***.

The card will then be brought to the second punch station in the same manner as it was brought to the first punch station and simultaneously a successive card will be brought to the first punch station. Subsequent to an operation at the second punch station the card thereat is then transported to the stacking means, not shown, while the successive card is brought to the second punch station and the card succeeding the successive card is brought to the first punch station. This completes a cycle of operation for successively transporting cards from a feeding means to first and second punch stations and from the second punch station to any suitable stacking means and further operation would be conducted in a like manner.

From the foregoing it is seen that this invention provides a transport apparatus which frictionally engages cards to convey the same at high speeds without damage by maintaining low relative velocities between the card and the apparatus. It is further seen in this invention that the transport apparatus aids or cooperates in keeping the card aligned at an operating station. Moreover, in this invention means are provided to positively displace the card, in the event impeding forces are encountered which could not be overcome by the frictional urging of the transport apparatus to move the card.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims:

What is claimed is:

1. A transport device for receiving articles successively fed thereto and moving the same along a predetermined path comprising conveying means having a projecting element extending outwardly therefrom to provide a stop for the articles successively fed thereto, driving means for driving said conveying means at a velocity substantially equal to the velocity of the fed articles, means for frictionally urging said fed articles in the direction of movement of said conveying means against said projecting elements and to move therewith and means for varying the velocity of said driving means to accelerate and decelerate said projecting element in a predetermined manner.

2. A transport device for receiving articles successively fed thereto and moving the same along a predetermined path comprising a first movable means for receiving articles presented thereto and having spaced projecting elements extending therefrom to flank the articles, a second movable means for frictionally engaging said articles received by said first movable means and adapted to continually urge the articles in the direction of movement of said first movable means so as to hold the articles against one of the flanking projecting elements, a first driving means for driving said first movable means in a predetermined manner, a second driving means for driving said second movable means so that the articles thereby engaged are frictionally urged against said one of said flanking projecting elements and held thereagainst to move in accordance with the movement of said first movable means, means for varying the velocity of said first driving means to drive the first movable means intermittently through a period of acceleration and deceleration and reaching a maximum velocity therebetween, and means for causing said second driving means to drive the second movable means at a constant velocity equal to the maximum velocity of said first driving means.

3. A transport device according to claim 2 wherein causing means causes said second driving means to drive the second movable means at a velocity greater than the maximum velocity of said first driving means.

4. A transport device according to claim 3 including means for causing said first movable means to dwell for a predetermined period of time after a period of deceleration.

5. A transport device for receiving articles successively fed thereto and moving the same along a predetermined path comprising first movable means for receiving articles presented thereto and having spaced projecting elements extending therefrom to flank the articles fed thereto, second movable means for frictionally engaging said fed articles and to continually urge the same in the direction of movement of said first movable means, first driving means for intermittently driving said first movable means to accelerate and decelerate the same from rest to a maximum velocity and from said maximum velocity to rest, respectively, second driving means for driving said second movable means at a constant velocity equal to the maximum velocity of said first movable means so that the articles engaged by said second movable means are frictionally urged against one of said flanking projecting elements and held thereagainst to follow the movements thereof, and stop means operable in synchronism with said first driving means to engage said articles prior to said first movable means coming to rest and to release the same before said first movable means is accelerated from rest.

6. A transport device according to claim 5 wherein said second driving means drives said second movable means at a constant velocity greater than the maximum velocity of said first movable means.

7. A transport device for receiving articles successively fed thereto and moving the same along a predetermined path comprising a first pair of parallel spaced endless belts having projecting elements extending outwardly therefrom to flank the articles fed thereto, a first driving means for intermittently driving said first pair of belts to accelerate and decelerate the same from rest to a maximum velocity and from said maximum velocity to rest, respectively, a second pair of parallel spaced endless belts disposed to frictionally engage said articles and driven to urge said articles against one of said flanking projecting elements on each belt of said first pair of belts to follow the movement thereof, and a second driving means for driving said second pair of belts at a constant velocity equal to the maximum velocity that said first pair of belts is driven to frictionally urge said articles against said one of said projecting elements on each belt of said first pair of belts to move therewith.

8. A transport device according to claim 7 wherein said second driving means drives said second pair of belts at a constant velocity greater than the maximum velocity of said first pair of belts.

9. A transport device for receiving articles successively fed thereto and moving the same along a predetermined path comprising a first pair of parallel spaced endless belts having projecting elements extending therefrom to flank the articles fed thereto, a first driving means for intermittently driving said first pair of belts to accelerate and decelerate the same from a rest to a maximum velocity and from said maximum velocity to rest, respectively, a second pair of parallel spaced endless belts disposed to frictionally engage said articles and driven to urge said articles against one of said flanking projecting elements on each belt of said pair of first belts to follow the movement thereof, a second driving means for driving said second pair of belts at a constant velocity equal to the maximum velocity that said first pair of belts is driven to frictionally urge said articles against said one of said projecting elements on each belt of said first pair of belts to move therewith, and stop means operable in synchronism with said first driving means to enter the predetermined path to engage one of said articles prior to said first pair of endless belts coming to rest whereby the article engaged is against said stop means by the frictional urging of said second pair of belts, said stop means being removed from the predetermined path before said first pair of belts is accelerated from rest.

10. A transport device according to claim 9 wherein said second driving means drives said second pair of endless belts at a constant velocity greater than the maximum velocity of said first pair of belts.

11. A transport apparatus for receiving record cards fed thereto at a constant rate and transferring the same along a predetermined card path comprising a first pair of parallel spaced endless belts having spaced projecting elements extending outwardly therefrom to flank the leading and trailing edges of said record cards to permit relative movement of the same therebetween, a second pair of parallel spaced endless belts disposed to overlie said first pair of belts to frictionally engage cards thereagainst, first driving means for accelerating and decelerating said first pair of belts from rest to a maximum velocity and to rest, respectively, second driving means for driving said second pair of belts at a constant velocity equal to the maximum velocity that said first pair of belts is driven so that the leading edge of the cards abuts the associated projecting elements on each belt of said first pair of belts to follow the movement thereof, a card aligner movable into and out of said card path, and means for operating said card aligner in synchronism with said first driving means so that said card aligner enters the card path to engage the leading edge of one of said cards prior to said first driving means bringing said first pair of belts to rest and leaves said card path prior to said first pair of belts being accelerated from rest.

12. A transport apparatus as in claim 11 wherein said second pair of belts maintains the leading edge of the card against said card aligner as the same is in said card path and thereafter moves the card relative to said first pair of belts to abut said associated projecting elements.

13. A transport apparatus for receiving record cards fed thereto at a constant rate and conveying the same along a predetermined path comprising a first driven element for receiving and supporting said record cards fed thereto at a constant rate and having spaced projecting elements extending therefrom to flank the leading and trailing edges of said record cards, a second driven element disposed for frictionally engaging said record cards and driven to urge and hold the leading edge of said cards against associate projecting elements, first driving means for intermittently driving said first driven element to accelerate the same from rest to a maximum velocity and then decelerate to rest, and second driving means for driving said second driven element at a constant velocity equal to the maximum velocity of said first driven element so that said record cards engage said associated projecting elements on said first driven element and remain in engagement therewith to follow the movement thereof.

14. A transport apparatus for receiving record cards successively fed thereto at a constant rate and advancing the same along a predetermined path comprising a first driven element disposed to receive and support said cards and having spaced projecting elements extending therefrom to lie adjacent the leading edge of said cards as they are successively fed thereto, a second driven element disposed for frictionally engaging said cards and driven to urge and hold the leading edge of said cards against the adjacent projecting elements, first driving means for driving said first driven element with a low relative velocity with respect to said record cards at the moment the same are presented thereto and thereafter at a maximum velocity, and second driving means for driving said second driven element at a constant velocity equal to the maximum velocity of said first driven element so that the leading edges of said cards engage the adjacent projecting elements and remain in engagement therewith to follow the movement thereof.

15. Transport apparatus for feeding record cards along a predetermined card path comprising a pair of cooperating feed rolls for successively feeding record cards along said card path at a predetermined constant velocity, a first pair of parallel spaced endless belts each having pairs of spaced projecting elements extending outwardly therefrom, said first pair of belts being positioned relative to said cooperating feed rolls to successively receive the articles fed by said feed rolls while the articles are still under the control thereof, means for driving said first endless belts at a rate so that one projecting element of one pair of projecting elements of each belt is in the feed path and leading the leading edge of one record of said record cards being fed by said cooperating feed rolls while the other projecting element of said one pair of projecting elements is out of said feed path, said other projecting element entering said feed path to trail the trailing edge of said one record card upon release of the same from the cooperating feed rolls, and means operable for urging said one record card against said one projecting element of each first endless belt upon release of said one record card from said cooperating feed rolls.

16. Transport apparatus of the type described in claim 15 wherein said means operable for urging said one record card consists of a second pair of spaced endless belts disposed to form a bite with said first pair of endless belts, and means for driving said second pair of endless belts so that the same urge said one record card into engagement with said one projecting element of each first endless belt.

References Cited in the file of this patent

UNITED STATES PATENTS

| | | |
|---|---|---|
| 534,298 | Toye | Feb. 19, 1895 |
| 1,286,714 | Moore | Dec. 3, 1918 |
| 2,033,320 | Belluche | Mar. 10, 1936 |
| 2,101,268 | Novick | Dec. 7, 1937 |
| 2,170,489 | Spiess | Aug. 22, 1939 |
| 2,406,006 | Eckhard | Aug. 20, 1946 |
| 2,638,342 | Luehrs | May 12, 1953 |

FOREIGN PATENTS

| | | |
|---|---|---|
| 642,300 | Great Britain | Aug. 30, 1950 |

UNITED STATES PATENT OFFICE
CERTIFICATE OF CORRECTION

Patent No. 2,955,822 October 11, 1960

Harold P. Wicklund

It is hereby certified that error appears in the printed specification of the above numbered patent requiring correction and that the said Letters Patent should read as corrected below.

Column 3, line 12, for "belt" read -- belts --; line 35, for "position" read -- station --; column 7, line 38, for "elements" read -- element --; column 9, line 38, for "associate" read -- associated --.

Signed and sealed this 11th day of April 1961.

(SEAL)
Attest:

ERNEST W. SWIDER
Attesting Officer

ARTHUR W. CROCKER
Acting Commissioner of Patents